(12) United States Patent
Chai

(10) Patent No.: US 9,374,293 B2
(45) Date of Patent: Jun. 21, 2016

(54) METHOD FOR DYNAMICALLY ADJUSTING RESOURCE AND SCHEDULING DEVICE

(71) Applicant: HUAWEI TECHNOLOGIES CO., LTD., Shenzhen (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 159 days.

(21) Appl. No.: 14/027,882

(22) Filed: Sep. 16, 2013

(65) Prior Publication Data

US 2014/0016650 A1 Jan. 16, 2014

Related U.S. Application Data

(63) Continuation of application No. PCT/CN2011/072510, filed on Apr. 7, 2011.

(51) Int. Cl.

| | | |
|---|---|---|
| *H04L 12/28* | (2006.01) | |
| *H04L 12/751* | (2013.01) | |
| *H04L 12/721* | (2013.01) | |
| *H04L 12/24* | (2006.01) | |
| *G06F 9/50* | (2006.01) | |

(52) U.S. Cl.
CPC ............... *H04L 45/02* (2013.01); *G06F 9/505* (2013.01); *G06F 9/5088* (2013.01); *H04L 41/5054* (2013.01); *H04L 45/12* (2013.01); *G06F 2209/5016* (2013.01); *H04L 45/70* (2013.01)

(58) Field of Classification Search
CPC ..... H04L 45/02; H04L 45/12; H04L 41/5054; H04L 45/70; G06F 9/5088; G06F 9/505; G06F 2209/5016

See application file for complete search history.

(56) References Cited

U.S. PATENT DOCUMENTS

| | | | |
|---|---|---|---|
| 7,203,944 B1 * | 4/2007 | van Rietschote et al. ..... | 718/104 |
| 2010/0205252 A1 | 8/2010 | Dorai et al. | |
| 2010/0318608 A1 | 12/2010 | Huang et al. | |

(Continued)

FOREIGN PATENT DOCUMENTS

| | | |
|---|---|---|
| CN | 101819545 A | 9/2010 |
| CN | 101938416 A | 1/2011 |
| WO | 2005/017750 A2 | 2/2005 |

OTHER PUBLICATIONS

PCT International Search Report and Written Opinion of the International Searching Authority mailed Jan. 19, 2012 in corresponding International Application No. PCT/CN2011/072510.

(Continued)

*Primary Examiner* — Lonnie Sweet
(74) *Attorney, Agent, or Firm* — Staas & Halsey LLP

(57) ABSTRACT

The present invention provides a method for dynamically adjusting a resource and a scheduling device. By adopting the method for dynamically adjusting a resource and the scheduling device that are provided in the present invention, when routing is performed according to the adjusted routing table, a resource only needs to process a session in a number segment allocated to the resource itself, thereby avoiding an error caused by scheduling across number segments, improving correctness of the method for dynamically adjusting a resource, avoiding that a resource cannot be released because a service session exists for a long time, and improving resource utilization of the method for dynamically adjusting a resource.

10 Claims, 4 Drawing Sheets

(56) References Cited

U.S. PATENT DOCUMENTS

2011/0085563 A1* 4/2011 Kotha et al. .................. 370/401
2011/0153839 A1* 6/2011 Rajan ..................... H04L 47/32
                                                          709/227

OTHER PUBLICATIONS

Extended European Search Report dated Mar. 20, 2014 in corresponding European Patent Application No. 11744258.2.

* cited by examiner

METHOD FOR DYNAMICALLY ADJUSTING RESOURCE AND SCHEDULING DEVICE

CROSS-REFERENCE TO RELATED APPLICATIONS

This application is a continuation of International Application No. PCT/CN2011/072510, filed on 7 Apr. 2011, which is hereby incorporated by reference in its entirety.

TECHNICAL FIELD

Embodiments of the present invention relate to cloud computing technologies, and in particular, to a method for dynamically adjusting a resource and a scheduling device.

BACKGROUND

At present, cloud computing starts to be widely applied in various fields. In the cloud computing manner, a method for dynamically adjusting a resource is adopted to adjust resource allocation according to a requirement of a service for a resource. When a service requires a resource, a resource is allocated to the service. When the service does not require the resource, the allocated resource is reclaimed, thereby improving resource utilization and reducing hardware costs and management costs.

In an existing method for dynamically adjusting a resource, when the amount of user requests for a service reaches a capability threshold of a current resource of the service, a new resource is allocated to the service. In addition, a new service request is routed to the new resource for processing, and a currently existing service session remains on the original resource for processing. For a session-type service, durations of sessions of the service vary, and some sessions have a long duration, and these sessions may affect an original scheduling policy. For example, in a case of routing based on number segments, when a number segment processed by a resource node is changed, a currently existing service session still remains on the node for processing. Therefore, the node still needs to process a session beyond the number segment after the number segment is changed. This results in a scheduling error. In addition, during resource reclaiming, a service is allowed to release a resource only after service running on the current resource is completed, that is, no user uses the service. As a result, the resource cannot be released for a long time. In conclusion, the existing method for dynamically adjusting a resource features low correctness and low resource utilization.

SUMMARY

An embodiment of the present invention provides a method for dynamically adjusting a resource to solve a defect in the prior art and improve resource scheduling correctness and resource utilization.

An embodiment of the present invention further provides a scheduling device to solve a defect in the prior art and improve resource scheduling correctness and resource utilization.

An embodiment of the present invention provides a method for dynamically adjusting a resource, including:

adjusting a routing table according to a preset adjusting rule;

migrating, when the adjusting the routing table affects an online service session, the online service session from a source resource indicated by the routing table before the adjustment to a target resource indicated by the adjusted routing table, wherein the adjusting the routing table affects the online service session comprises a service resource for the online service session indicated by the adjusted routing table is different from that indicated by the routing table before the adjustment; and routing a request message according to the adjusted routing table.

An embodiment of the present invention further provides a scheduling device, including:

a routing table control unit, configured to adjust a routing table according to a preset adjusting rule;

a migration control unit, configured to migrate, when the adjustment performed by the routing table control unit on the routing table affects an online service session, the online service session from a source resource indicated by the routing table before the adjustment to a target resource indicated by the adjusted routing table, wherein the adjusting the routing table affects the online service session comprises a service resource for the online service session indicated by the adjusted routing table is different from that indicated by the routing table before the adjustment; and a routing unit, configured to route a request message according to the adjusted routing table.

As can be seen from the technical solutions, in the embodiments of the present invention, an online service session existing before a routing table is adjusted is migrated. Therefore, when routing is performed according to the adjusted routing table, each resource only needs to process a session in a number segment allocated to the resource itself, thereby avoiding an error caused by scheduling across number segments and improving correctness of the method for dynamically adjusting a resource. In addition, online service sessions on a virtual machine to be released are migrated after the routing table is adjusted, thereby avoiding that resources cannot be released because these service sessions exist for a long time, and improving resource utilization of the method for dynamically adjusting a resource.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

A virtual machine (Virtual Machine, VM for short) technology is an efficient technology for dynamically allocating resource. A virtual machine refers to a complete computer system that is simulated by software, has complete hardware system functions, and runs in a completely isolated environment. The virtual machine technology is adopted to perform virtualization on a hardware resource. When a resource is allocated to a service, the service is allocated to a virtual machine corresponding to the resource for processing. In this way, the resource can be provided for multiple different applications based on different application platforms, thereby achieving the objectives of isolating the applications and using the resource at high efficiency. In the following embodiments of the present invention, a dynamic resource adjustment performed by adopting the virtual machine technology is taken as an example.

Figure 1:
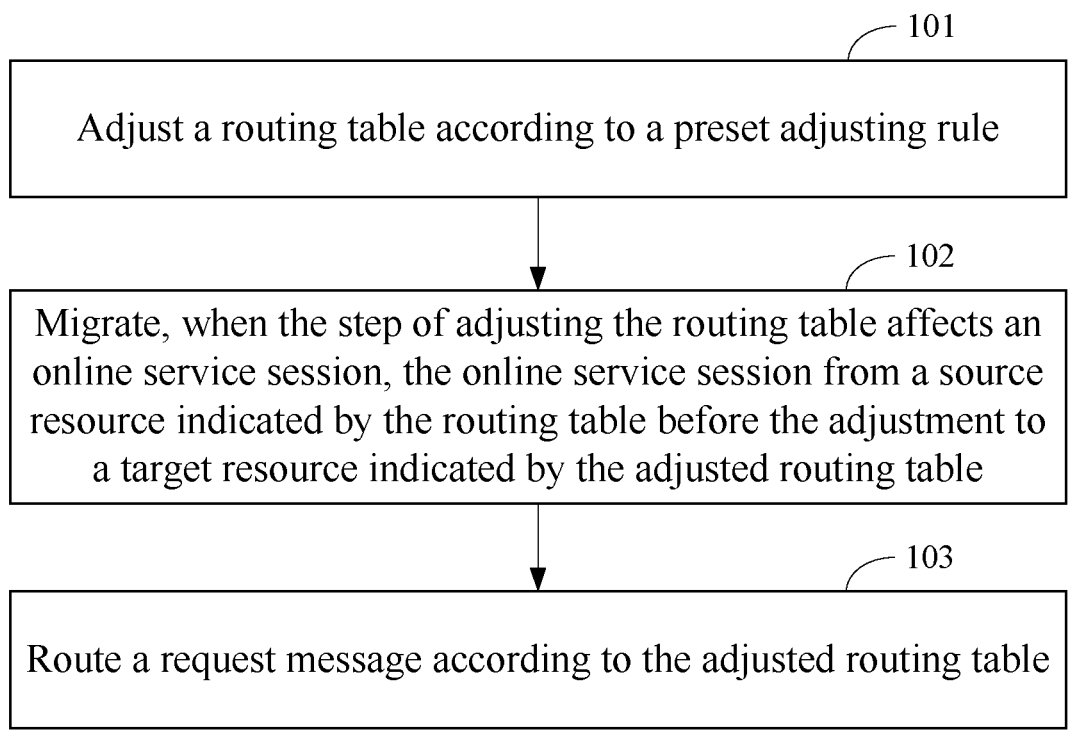
FIG. 1 is a flowchart of a method for dynamically adjusting a resource according to a first embodiment of the present invention.

FIG. 1 is a flowchart of a method for dynamically adjusting a resource according to a first embodiment of the present invention. As shown in FIG. 1, the method includes the following procedure:

Step 101: Adjust a routing table according to a preset adjusting rule.

During a dynamic resource adjustment, a routing table is mainly used to allocate a resource for processing a received request. After receiving a user service request, a scheduling device searches, according to a user attribute such as a number, the routing table for a resource capable of providing a service for the user service, and routes the user service request to the resource for processing.

A routing manner may be routing based on number segments or routing based on discrete numbers. Accordingly, the routing table also includes a number segment routing table and a discrete number routing table.

Taking the routing based on number segments as an example, a structure of the number segment routing table is shown in Table 1.

TABLE 1

| Number segment routing table | | | | | |
|---|---|---|---|---|---|
| Start Number | End Number | Number Segment Type | Service Resource Address | Service Resource Port Number | Remarks |
| 13X0939XXXX | 13X0939XXXX | 1 | 10.XX.XX.XX | XXXX | None |
| ... | ... | ... | ... | ... | |

Here, the start number is a number from which a number segment starts. The end number is a number at which the number segment ends. The service resource address and port number indicate a resource providing a service for a service request of a user in the number segment. When receiving a service request of a user in the number segment, the scheduling device routes the request to the resource for processing.

Taking the routing based on discrete numbers as an example, a structure of the discrete number routing table is shown in Table 2.

TABLE 2

| Discrete number routing table | | | | |
|---|---|---|---|---|
| Number | Number Type | Service Resource Address | Service Resource Port Number | Remarks |
| 13XXXXXXXXX | 1 | 10.XX.XX.XX | XXXX | None |
| ... | ... | ... | ... | |

Here, the number refers to a number sending a service request. The service resource address and port number indicate a resource providing a service for a service request from a user with the number. When receiving a service request of the user with the number, the scheduling device routes the request to the resource for processing.

Step 102: Migrate, when the adjusting the routing table affects an online service session, the online service session from a source resource indicated by the routing table before the adjustment to a target resource indicated by the adjusted routing table.

In the first embodiment, the resource mainly refers to a virtual machine or another physical machine. The online service session refers to a currently existing service session, that is, a certain user is using the service at present. That the adjusting the routing table affects the online service session may be specifically embodied as follows: A service resource for the online service session is changed in the adjusted routing table, that is, a service resource for the online service session indicated by the adjusted routing table is different from that indicated by the routing table before the adjustment. If a service resource for a certain online service session is not changed in the adjusted routing table, that is, a service resource for the online service session indicated by the adjusted routing table is the same as that indicated by the routing table before the adjustment, it is regarded that the adjusting the routing table does not affect the online service session.

Step 103: Route a request message according to the adjusted routing table.

In the first embodiment of the present invention, after a routing table is adjusted, if the adjustment on the routing table affects an online service session, the online service session is migrated to a target virtual machine indicated by the adjusted routing table, and then a request message is routed according to the adjusted routing table. An online service session existing before the routing table is adjusted is migrated. Therefore, in a case where routing is performed according to a number segment, when the routing is performed according to the adjusted routing table, each resource only needs to process a session in a number segment allocated to the resource itself, thereby avoiding an error caused by scheduling across number segments and improving correctness of the method for dynamically adjusting a resource. Furthermore, online service sessions on a resource to be released are migrated after the routing table is adjusted, thereby avoiding that resources cannot be released because these service sessions exist for a long time, and improving resource utilization of the method for dynamically adjusting a resource.

Figure 2:
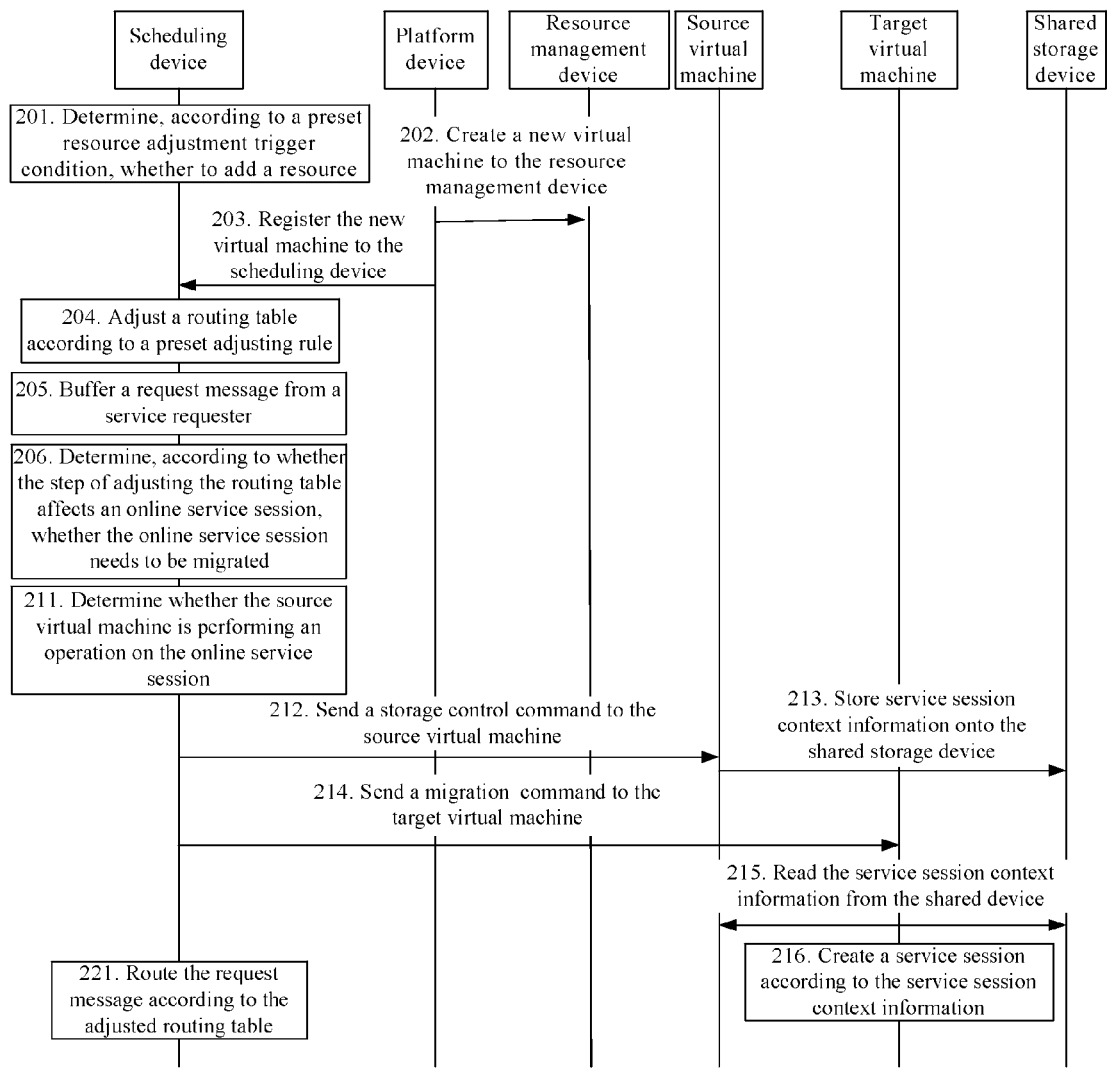
FIG. 2 is a signaling flowchart of a method for dynamically adjusting a resource according to a second embodiment of the present invention.

FIG. 2 is a signaling flowchart of a method for dynamically adjusting a resource according to a second embodiment of the present invention. A scheduling device for scheduling a request message adopts this method to control a resource to implement a dynamic resource adjustment. During the dynamic resource adjustment, a platform device for monitoring a service, a resource management device for maintaining a resource, a source virtual machine, a target virtual machine, and a shared storage device are also involved in addition to the scheduling device. In the second embodiment of the present invention, a dynamic resource adjustment procedure in which a resource is added is taken as an example for description. In addition, in the second embodiment of the present invention, a virtual machine is specifically taken as an example of the resource. As shown in FIG. 2, the method includes the following procedure:

Step 201: A scheduling device determines, according to a preset resource adjustment trigger condition, whether to add a resource.

In this step, the scheduling device determines, according to the preset resource adjustment trigger condition, whether a resource needs to be added or released. In the second embodiment, only that the scheduling device determines whether a resource needs to be added is taken as an example for description. This step may be completed individually by the scheduling device or completed by the scheduling device by monitoring service and resource use conditions of a platform device.

In this step, the preset resource adjustment trigger condition may adopt multiple specific implementation manners. The following describes four manners. In practical applications, it is not limited to these four manners and another specific implementation manner may be set according to a practical condition.

Manner 1: Set a threshold of a resource load or service load and monitor the resource load or service load. The service load is a load attribute of a service itself, and includes the number of concurrent users, response time of the service, and the like. The resource load includes a memory usage, a CPU (Central Processing Unit, central processing unit) usage, network pressure, and the like of a virtual machine. The resource load or service load obtained from monitoring is compared with the threshold of the resource load or service load. Specifically, a different threshold of the resource load or service load may be respectively set for a case where a resource needs to be added or released. If the resource load or service load reaches a corresponding threshold of the resource load or service load, it is accordingly determined, according to the threshold of the resource load or service load, that a resource needs to be added or released.

Manner 2: Preconfigure a time or event trigger policy. Specifically, a different trigger policy may be respectively set for a case where a resource needs to be added or released. When a trigger policy is satisfied, it is accordingly determined, according to the trigger policy, that a resource needs to be added or released. For example, the time trigger policy is preconfigured as adding a resource on a set date such as a set holiday and a set date of a large-scale activity; and the event trigger policy is preconfigured as adding a resource when a certain set event occurs.

Manner 3: Establish a prediction model for resource allocation, and the prediction model triggers a resource adjustment procedure. The prediction model may have a self-learning capability. The prediction model estimates a resource requirement curve of a future period of time according to historical data and other reference index values, and determines, by comparing the requirement curve with a current resource capability curve, whether a resource needs to be added or released.

Manner 4: An administrator performs a configuration operation for a resource adjustment. Specifically, the administrator may perform a related configuration operation for adding or releasing a resource.

In the second embodiment, a determination result of step 201 being adding a resource is taken as an example. After it is determined that a resource needs to be added, a resource management device, a platform device, and the scheduling device coordinately create and register a new virtual machine. Specifically, the procedure of creating and registering the new virtual machine includes the following step 202 and step 203.

Step 202: A platform device creates a new virtual machine to the resource management device.

In this step, after it is determined that a resource needs to be added, the platform device applies to the resource management device for creating a new virtual machine. In addition, after the new virtual machine is created successfully, if no service application is installed on the created new virtual machine, the platform device installs a service application on the virtual machine, where the service application may be an online charging system (Online Charging System, OCS for short). The virtual machine has a corresponding service server function after the service application is installed.

Step 203: The platform device registers the new virtual machine to the scheduling device.

In this step, the platform device registers the new virtual machine to the scheduling device, where registration information may include but is not limited to one or more of an Internet Protocol (Internet Protocol, IP for short) address of the virtual machine, a port of the virtual machine, and capability information of the virtual machine.

Step 204: The scheduling device adjusts a routing table according to a preset adjusting rule.

In this step, the scheduling device adjusts a routing table. A routing manner of the routing table may be routing based on number segments, routing based on discrete numbers, or routing based on another routing policy. The adjusting rule may be preset according to a specific routing manner. Specifically, methods for adjusting the routing table in different routing manners are as follows:

If the routing manner is based on number segments, the routing table is a number segment table, and the adjusting rule may be re-dividing the number segments. An exemplary implementation manner is as follows: For the purpose of minimizing the impact of re-dividing the number segments, a number segment of users of a virtual machine with the highest pressure may be divided into two number segments, so that the adjusting the routing table affects only one virtual machine and scheduling of other virtual machines is not affected.

If the routing manner is based on discrete numbers, the routing table is a discrete number table, and the adjusting rule may be allocating an offline user of a virtual machine with the highest pressure to the new virtual machine. The offline user refers to a user currently having no related service session.

Step 205: The scheduling device buffers a request message from a service requester.

In this step, the scheduling device buffers all request messages from the service requester before the adjusted routing table is loaded and activated.

Step 206: The scheduling device determines, according to whether the adjusting the routing table affects an online service session, whether the online service session needs to be migrated. If yes, the online service session is migrated from a source virtual machine indicated by the routing table before the adjustment to a target virtual machine indicated by the adjusted routing table, and specifically, steps 211 to 217 are performed; otherwise, step 221 is performed.

In this step, the scheduling device determines whether the online service session needs to be migrated. Specifically, a determination basis may be whether the adjusting the routing table affects the online service session. The scheduling device determines, according to whether the adjusting the routing table affects the online service session, whether the online service session needs to be migrated. For example, for a certain user, server A provides a service for the user according to the routing table before the adjustment, and according to the adjusted routing table, server B needs to provide a service for the user. When the routing table is adjusted, the user has an online service session on server A. In this case, it is determined that the adjusting the routing table affects the online service session. When the adjusting the routing table affects the online service session, it is determined that the online service session needs to be migrated. When the adjusting the routing table does not affect the online service session, it is determined that the online service session does not need to be migrated.

Furthermore, the determination basis includes not only whether the adjusting the routing table affects the online service session but also a preset migration policy. Specifically, the scheduling device determines, according to the preset migration policy and whether the adjusting the routing table affects the online service session, whether the online service session needs to be migrated. The migration policy, such as waiting for service completion, immediately terminating an original service, and service migration, may be set according to a service characteristic. However, it is not limited to the several types. When the preset migration policy is service migration and the adjusting the routing table affects the online service session, it is determined that the online service session needs to be migrated. When the preset migration policy is not service migration or the adjusting the routing table does not affect the online service session, it is determined that the online service session does not need to be migrated.

If it is determined in step 206 that the online service session needs to be migrated, the online service session is migrated from the source virtual machine indicated by the routing table before the adjustment to the target virtual machine indicated by the adjusted routing table. Specifically, steps 211 to 217 are performed for each online service session to be migrated, and the online service session is migrated by performing steps 211 to 217.

Step 211: The scheduling device determines whether the source virtual machine is performing an operation on the online service session.

In this step, specifically, the scheduling device determines whether an atomic operation such as data processing or computing is being performed on the service session to be migrated on the source virtual machine. The atomic operation includes the following: When a session requester sends a service request, the source virtual machine, serving as a service server, processes the service request. If the source virtual machine is processing the service request, the scheduling device determines that the source virtual machine is performing an atomic operation on the service session to be migrated. If the source virtual machine, serving as the service server, has returned a response message of the service request, in this case, although the service session still exists, because the service server processes no service request at present, the scheduling device determines that the source virtual machine performs no atomic operation on the service session to be migrated.

If the determination result in step 211 is yes, the process returns to step 211 until the operation is completed. If the determination result in step 211 is no, the scheduling device controls the source virtual machine to store service session context information onto a shared storage device.

This specifically includes the following step 212 and step 213. That is to say, in step 211, it is monitored in real time whether the source virtual machine is performing an operation until it is monitored that the source virtual machine performs no operation. Then, the procedure goes to step 212.

In step 211, the procedure in which the scheduling device determines whether an atomic operation such as data processing or computing is being performed on the service session to be migrated on the source virtual machine may be implemented by adopting the following three specific methods:

Method 1: The source virtual machine, serving as the service server, provides a service status query interface, and the scheduling device queries, through the query interface, a status of the service session to be migrated on the source virtual machine. If it is an idle status, the determination result is no; and if it is a busy status, the determination result is yes.

Method 2: The scheduling device pre-establishes a message list of the service session. The scheduling device adds an operation request message to the message list when receiving the operation request message, and deletes the operation request message from the message list when receiving a response message corresponding to the operation request message. The scheduling device queries the message list. If the message list is empty, the determination result is no; and if the message list is not empty, the determination result is yes. Specifically, in the second embodiment of the present invention, the operation request message is a service request message.

Method 3: The scheduling device pre-establishes a message counter of the service session. When an operation request message is received, a value of the message counter increases by 1, and when a response message corresponding to the operation request message is received, the value of the message counter decreases by 1. The scheduling device queries the message counter. If the value of the message counter is zero, the determination result is no; and if the value of the message counter is not zero, the determination result is yes.

Regarding method 2 and method 3, if packet loss occurs during transmission or processing of an operation request message or a response message of the operation request message, an error may occur in the message list or the message counter, resulting in an error in a query result. One or two of the following measures may be taken to prevent this situation from occurring.

A first measure is as follows: When receiving a re-sent operation request message, the scheduling device deletes a record of an original operation request message corresponding to the re-sent operation request message from the message list or the message counter. Specifically, in an existing system for dynamically adjusting a resource, a sender of an operation request message has a packet loss determination mechanism. When finding that packet loss occurs on a certain operation request message, the sender re-sends the operation request message. The sender of the operation request message in the embodiments of the present invention is a service requester. The sender may add an identifier indicating re-sending into the re-sent message or use an identifier of the original operation request message, so as to identify the re-sent operation request message. After receiving the message, the scheduling device learns, according to the identifier, that the message is a re-sent message. Alternatively, the scheduling device may also learn, according to a sequence number of the received message, that the message is a re-sent message. If the scheduling device receives the re-sent operation request message from the sender of the operation request message, the scheduling device determines that packet loss occurs. In this case, to avoid an error, the scheduling device deletes the record of the original operation request message corresponding to the re-sent operation request message from the message list or the message counter.

A second measure is as follows: When no response message of an operation request message is received before a threshold time expires, the scheduling device deletes the record of the operation request message from the message list or the message counter. Specifically, the scheduling device presets a threshold time for receiving a response message of an operation request message. The scheduling devices starts timing while sending an operation request message to the source virtual machine serving as the service server, and then waits the source virtual machine to return a response message of the operation request message. If the threshold time expires and no response message of the operation request message is received from the source virtual machine, the scheduling device determines that packet loss occurs. In this case, to avoid an error, the scheduling device deletes the record of the operation request message from the message list or the message counter.

When it is determined in step 211 that no atomic operation such as data processing or computing is performed on the service session to be migrated on the source virtual machine, the scheduling device controls the source virtual machine to store the service session context information onto the shared storage device. The procedure in which the scheduling device controls the source virtual machine to store the service session context information onto the shared storage device specifically includes the following step 212 and step 213.

Step 212: The scheduling device sends a storage control command to the source virtual machine.

In this step, the scheduling device sends the storage control command, so that the source virtual machine stores the service session context information onto the shared storage device according to the storage control command. Another implementation manner is as follows: The source virtual machine does not need to store the context information according to the storage control command, but directly stores the service session context information onto the shared storage device after the service application performs each operation. In this implementation manner, step 212 may not be performed, and when it is determined in step 211 that the source virtual machine performs no operation, step 213 is directly performed.

Step 213: The source virtual machine stores the service session context information onto the shared storage device.

In this step, an exemplary implementation manner is as follows: The source virtual machine uses the identifier of the service session as a key value and stores the service session context information onto the shared storage device. Specifically, the stored service session context information may include a session identifier, session context data, and the like.

After step 213, the scheduling device controls the target virtual machine to acquire the service session context information from the shared storage device. The procedure in which the scheduling device controls the target virtual machine to acquire the service session context information from the shared storage device specifically includes the following step 214 and step 215.

Step 214: The scheduling device sends a migration instruction to the target virtual machine.

In this step, the scheduling device sends a migration instruction to the target virtual machine, where the migration instruction may include the key value in step 213, so that the target virtual machine reads, according to the key value, the service session context information stored on the shared storage device.

Step 215: The target virtual machine reads the service session context information from the shared device.

In this step, if the scheduling device sends, in step 214, the key value of the service session context information stored on the shared device, the target virtual machine reads the service session context information from the shared storage device according to the key value in this step.

If the implementation manner in which the target virtual machine acquires service session information from the shared storage device according to a new operation request message sent by an operation request initiator is adopted, in this step, the target virtual machine directly reads corresponding service session context information from the shared storage device according to the received new operation request message. For example, the target virtual machine acquires the corresponding service session context information from the shared storage device according to user identity information in the new operation request message.

Step 216: The target virtual machine creates a service session according to the service session context information.

In this step, the virtual machine creates an environment of the online service according to a session identifier, session context information, and the like in the service session context information, and starts a processing procedure corresponding to the session type.

After step 216, step 221 is performed.

Step 221: The scheduling device routes the request message according to the adjusted routing table.

In this step, the scheduling device loads and enables the adjusted routing table. After the adjusted routing table is enabled, the scheduling device first sends the session message that is from the service requester and buffered in step 205 to the target virtual machine according to the adjusted routing table. Then, the scheduling device routes, according to the adjusted routing table, all subsequently received new service request messages.

Based on the technical solution recorded in step 201 to step 221, the target virtual machine may further acquire the buffered service session context information from the shared storage device by using another specific implementation manner. For example, the target virtual machine may read the corresponding service session context information from the shared storage device according to the new operation request message sent by the operation request initiator. When this manner is adopted, step 221 is performed after step 213. The specific procedure of step 221 is as follows: The scheduling device routes the request message according to the adjusted routing table and sends the new operation request message to the target resource, where the new operation request message includes information, such as the user identity information and session identifier, capable of uniquely identifying current session of the user. After step 221, step 215 and step 216 are performed. The specific procedure of step 215 is as follows: The target virtual machine reads the corresponding service session context information from the shared device according to the user identity information or session identifier in the new operation request message.

In the second embodiment of the present invention, after a virtual machine is added and a routing table is adjusted, if the adjustment on the routing table affects an online service session, the online service session is migrated to a target virtual machine indicated by the adjusted routing table, and then a request message is routed according to the adjusted routing table. Therefore, when routing is performed according to the adjusted routing table, each virtual machine only needs to process a session in a number segment allocated to the virtual machine itself, thereby avoiding an error caused by scheduling across number segments and improving correctness of the method for dynamically adjusting a resource.

Figure 3:
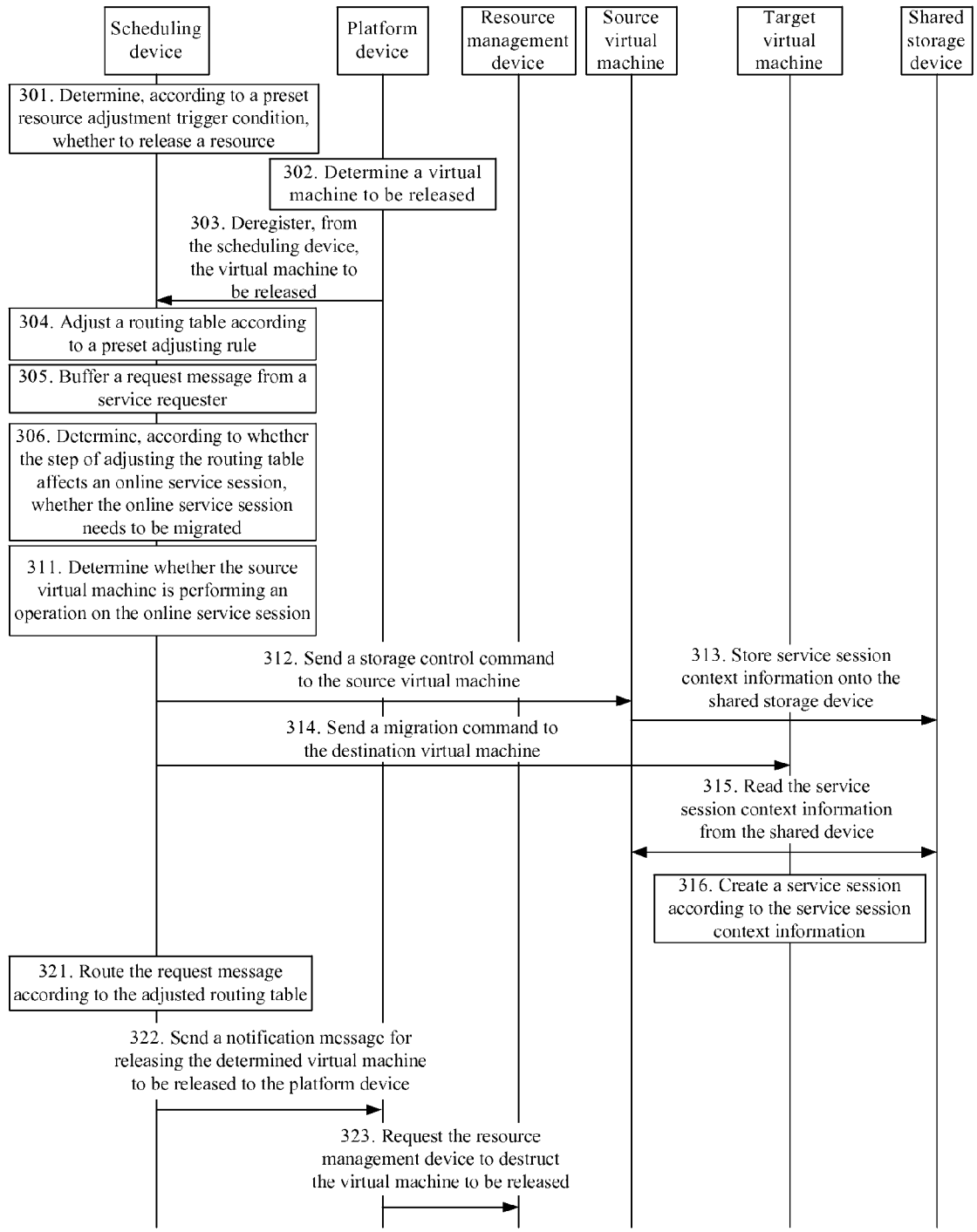
FIG. 3 is a signaling flowchart of a method for dynamically adjusting a resource according to a third embodiment of the present invention.

FIG. 3 is a signaling flowchart of a method for dynamically adjusting a resource according to a third embodiment of the present invention. In this embodiment, a dynamic resource adjustment procedure in which a resource is released is taken as an example for description. As shown in FIG. 3, the method includes the following procedure:

Step 301: A scheduling device determines, according to a preset resource adjustment trigger condition, whether to release a resource.

In this step, the scheduling device determines, according to the preset resource adjustment trigger condition, whether a resource needs to be added or released. In the third embodiment, only that the scheduling device determines whether a resource needs to be released is taken as an example for description. A specific method of this step is the same as step 201 in the second embodiment of the present invention and the details will not be described herein again. In the third embodiment, a determination result in step 301 being releasing a resource is taken as an example. After it is determined to release a resource, a platform device and the scheduling device coordinately deregister a virtual machine to be released. Specifically, the procedure of deregistering a virtual machine to be released includes the following step 302 and step 303.

Step 302: A platform device determines a virtual machine to be released.

Step 303: The platform device deregisters, from the scheduling device, the virtual machine to be released.

In this step, the platform device deregisters, from the scheduling device, the virtual machine to be released, where deregistration information may include but is not limited to one or more of an IP address of the virtual machine, a port of the virtual machine, and capability information of the virtual machine.

Step 304: The scheduling device adjusts a routing table according to a preset adjusting rule.

Step 305: The scheduling device buffers a request message from a service requester.

In this step, the scheduling device buffers all request messages from the service requester before the adjusted routing table is loaded and activated.

Step 306: The scheduling device determines, according to whether the adjusting the routing table affects an online service session, whether the online service session needs to be migrated. If yes, the online service session is migrated from a source virtual machine indicated by the routing table before the adjustment to a target virtual machine indicated by the adjusted routing table, and specifically, steps 311 to 317 are performed; otherwise, step 321 is performed.

Step 311: The scheduling device determines whether the source virtual machine is performing an operation on the online service session.

In this step, specifically, the scheduling device determines whether an atomic operation such as data processing or computing is being performed on the service session to be migrated on the source virtual machine.

Step 312: The scheduling device sends a storage control command to the source virtual machine.

Step 313: The source virtual machine stores service session context information onto a shared storage device.

Step 314: The scheduling device sends a migration instruction to the target virtual machine.

Step 315: The target virtual machine reads the service session context information from the shared device.

Step 316: The target virtual machine creates a service session according to the service session context information.

After step 316, step 321 is performed.

Step 321: The scheduling device routes the request message according to the adjusted routing table.

Specific implementation manners of step 304 to step 321 are respectively the same as step 205 to step 221 in the second embodiment of the present invention, and the details will not be described herein again.

Furthermore, when step 321 is being performed or after step 321 is performed, the following procedure may be further included:

Step 322: The scheduling devices sends a notification message for releasing the determined virtual machine to be released to the platform device.

In this step, the scheduling device determines that all sessions are migrated and sends the notification message for releasing the virtual machine to be released that is determined in step 302 to the platform device, and notifies, through the message, the platform device that the resource to be released has been in idle status.

Step 323: The platform device requests a resource management device to destruct the virtual machine to be released.

In this step, the platform device requests, according to the notification message for releasing the determined virtual machine to be released, the resource management device to destruct the virtual machine to be released, so as to release the resource.

In the third embodiment of the present invention, after a virtual machine to be released is determined and a routing table is adjusted, if the adjustment on the routing table affects an online service session, the online service session is migrated to a target virtual machine indicated by the adjusted routing table, and then a request message is routed according to the adjusted routing table. Services corresponding to a non-self number segment on each virtual machine are migrated after the routing table is adjusted. Therefore, it is avoided that resources cannot be released because of running of these services, thereby improving resource utilization of the method for dynamically adjusting a resource.

In the second embodiment of the present invention and the third embodiment of the present invention, the procedure of dynamically adjusting a resource is used to add or release a resource. In other embodiments of the present invention, the procedure of dynamically adjusting a resource may further be used to adjust a service load of each current resource. When the procedure of dynamically adjusting a resource is used to adjust the service load of each current resource, a scheduling device determines, according to a preset resource adjustment trigger condition, whether a service load of a current resource needs to be adjusted. Specifically, the scheduling device may adopt a method the same as that recorded in step 201 in the second embodiment of the present invention to determine whether the service load of each current resource needs to be adjusted. When the service load needs to be adjusted, a routing table is adjusted according to a preset adjusting rule. When the adjusting the routing table affects an online service session, the online service session is migrated from a source virtual machine or physical machine indicated by the routing table before the adjustment to a target virtual machine or physical machine indicated by the adjusted routing table. A specific migration procedure is the same as step 205 to step 221 in the second embodiment of the present invention and the details will not be described herein again.

Figure 4:
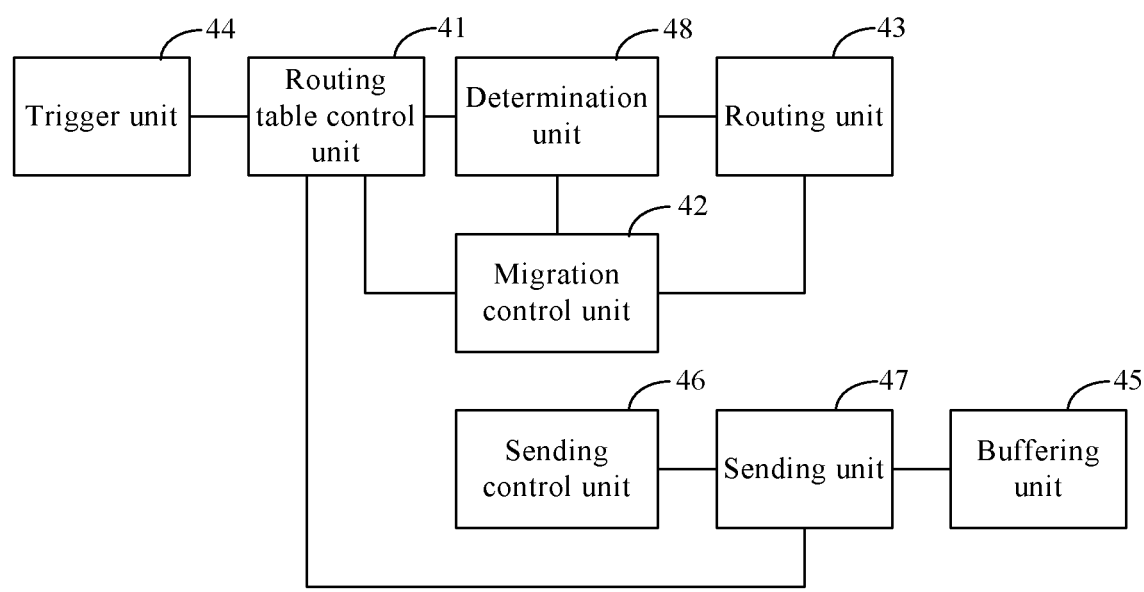
FIG. 4 is a schematic structural diagram of a scheduling device according to a fourth embodiment of the present invention.

FIG. 4 is a schematic structural diagram of a scheduling device according to a fourth embodiment of the present invention. As shown in FIG. 4, the scheduling device includes at least a routing table control unit 41, a migration control unit 42, and a routing unit 43. For a specific processing procedure of each unit, reference may be made to the description in the first embodiment of the present invention to the third embodiment of the present invention.

The routing table control unit 41 is configured to adjust a routing table according to a preset adjusting rule. The migration control unit 42 is configured to migrate, when the adjustment performed by the routing table control unit 41 on the routing table affects an online service session, the online service session from a source resource indicated by the routing table before the adjustment to a target resource indicated by the adjusted routing table. The routing unit 43 is configured to route a request message according to the adjusted routing table.

Based on the technical solutions, furthermore, the scheduling device may further include a trigger unit 44, configured to determine, according to a preset resource adjustment trigger condition, to add a resource, release a resource, or adjust a service load of a current resource, and notify the routing table control unit 41.

Based on the technical solutions, furthermore, the scheduling device may further include a buffering unit 45, a sending control unit 46, and a sending unit 47. The buffering unit 45 is configured to buffer a session message from a service requester. The sending control unit 46 is configured to control the sending unit 47 to send the session message that is from the service requester and buffered by the buffering unit 45 to the target resource. The sending unit 47 is configured to send, under the control of the sending control unit 46, the session message that is from the service requester and buffered by the buffering unit 45 to the target resource.

Based on the technical solutions, furthermore, the scheduling device may further include a determination unit 48. The determination unit 48 is configured to determine, according to a preset migration policy and whether the adjustment performed by the routing table control unit 41 on the routing table affects the online service session, whether the online service session needs to be migrated; if yes, control the migration control unit 42 to migrate the online service session from the source resource indicated by the routing table before the adjustment to the target resource indicated by the adjusted routing table; otherwise, control the routing unit 43 to route the request message according to the adjusted routing table.

Based on the technical solutions, furthermore, the migration control unit 42 is specifically configured to determine whether the source resource is performing an operation on the online service session; if yes, continue to determine whether the source resource is performing an operation on the online service session; otherwise, control the source resource to store service session context information onto the shared storage device. The sending control unit 46 is specifically configured to control the target resource to acquire the service session context information from the shared storage device and control the target resource to create an online service session according to the service session context information.

Based on the technical solutions, furthermore, the migration control unit 42 is specifically configured to query a status of the service session on the source resource; if it is an idle status, determine that the source resource is not performing an operation on the online service session; and if it is a busy status, determine that the source resource is performing an operation on the online service session. Alternatively, the migration control unit 42 is specifically configured to pre-establish a message list of the service session; add an operation request message to the message list when receiving the operation request message; delete the operation request message from the message list when receiving a response message of the operation request message; query the message list; and if the message list is empty, determine that the source resource is not performing an operation on the online service session, and if the message list is not empty, determine that the source resource is performing an operation on the online service session. Alternatively, the migration control unit 42 is specifically configured to pre-establish a message counter of the service session; increase a value of the message counter by 1 when receiving an operation request message;

decrease the value of the message counter by 1 when receiving a response message of the operation request message; query the message counter; and if the value of the message counter is zero, determine that the source resource is not performing an operation on the online service session, and if the value of the message counter is not zero, determine that the source resource is performing an operation on the online service session.

In the fourth embodiment of the present invention, after a routing table control unit adjusts a routing table, if the adjustment on the routing table affects an online service session, the migration control unit migrates the online service session to a target virtual machine indicated by the adjusted routing table, and then a routing unit routes a request message according to the adjusted routing table. An online service session existing before the routing table is adjusted is migrated. Therefore, an error caused by scheduling across number segments is avoided, thereby improving correctness of the method for dynamically adjusting a resource. In addition, it is avoided that a resource cannot be released because a service session exists for a long time, thereby improving resource utilization of the method for dynamically adjusting a resource.

It should be noted that, for the brevity of description, the foregoing method embodiments are represented as a series of actions. However, persons skilled in the art should understand that, the present invention is not limited to the order of the described actions, because according to the present invention, some certain steps may adopt other orders or occur simultaneously. It should be further understood by persons skilled in the art that, the described embodiments in the specification all belong to exemplary embodiments, and the involved actions and modules are not necessarily required by the present invention.

In the foregoing embodiments, the description of each of the embodiments has respective focuses. For a part that is not described in detail in a certain embodiment, reference may be made to related descriptions in other embodiments.

Persons of ordinary skill in the art may understand that, all or a part of the steps in the method embodiments may be implemented by a program instructing relevant hardware. The program may be stored in a computer readable storage medium. When the program is run, the steps in the method embodiments are performed. The foregoing storage medium may be any medium capable of storing program codes, such as a ROM, a RAM, a magnetic disk, or an optical disk.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that, they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present invention.

What is claimed is:

1. A method for dynamically adjusting a resource, comprising:
adjusting, by a scheduling device, a routing table according to a preset adjusting rule;
migrating, by the scheduling device, when the adjusting the routing table affects an online service session, the online service session from a source resource indicated by the routing table before the adjustment to a target resource indicated by the adjusted routing table, wherein the adjusting the routing table affects the online service session comprises a service resource for the online service session indicated by the adjusted routing table is different from that indicated by the routing table before the adjustment; and
routing, by the scheduling device, a request message according to the adjusted routing table, wherein
after the adjusting a routing table according to a preset adjusting rule and before the migrating the online service session from a source resource indicated by the routing table before the adjustment to a target resource indicated by the adjusted routing table, further comprising: buffering a session message from a service requester; and
after the migrating the online service session from a source resource indicated by the routing table before the adjustment to a target resource indicated by the adjusted routing table and before the routing a request message according to the adjusted routing table, further comprising: sending the buffered session message from the service requester to the target resource.

2. A method for dynamically adjusting a resource, comprising:
adjusting, by a scheduling device, a routing table according to a preset adjusting rule;
migrating, by the scheduling device, when the adjusting the routing table affects an online service session, the online service session from a source resource indicated by the routing table before the adjustment to a target resource indicated by the adjusted routing table, wherein the adjusting the routing table affects the online service session comprises a service resource for the online service session indicated by the adjusted routing table is different from that indicated by the routing table before the adjustment; and routing, by the scheduling device, a request message according to the adjusted routing table, wherein the migrating the online service session from a source resource indicated by the routing table before the adjustment to a target resource indicated by the adjusted routing table comprises:
determining whether the source resource is performing an operation on the online service session; if yes, continue to determine whether the source resource is performing an operation on the online service session; otherwise, controlling the source resource to store service session context information onto a shared storage device.

3. The method according to claim 2, wherein the determining whether the source resource is performing an operation on the online service session comprises:
querying a status of the service session on the source resource, if it is an idle status, determine that the source resource is not performing an operation on the online service session; and if it is a busy status, determine that the source resource is performing an operation on the online service session;
or
pre-establishing a message list of the service session, adding an operation request message to the message list when receiving the operation request message, and deleting the operation request message from the message list when receiving a response message of the operation request message; and querying the message list, wherein if the message list is empty, the determination result is not, and if the message list is not empty, the determination result is yes;
or
pre-establishing a message counter of the service session, increasing a value of the message counter by 1 when receiving an operation request message, and decreasing the value of the message counter by 1 when receiving a response message of the operation request message; and
querying the message counter, wherein if the value of the message counter is zero, the determination result is no, and if the value of the message counter is not zero, the determination result is yes.

4. The method according to claim 3,
after the pre-establishing a message list of the service session, further comprising:
when receiving a re-sent operation request message, deleting a record of an original operation request message corresponding to the re-sent operation request message from the message list; and/or presetting a threshold time, starting timing while sending an operation request message, and deleting a record of the operation request message from the message list when no response message of the operation request message is received before the threshold time expires; and
after the pre-establishing a message counter of the service session, further comprising:
when receiving a re-sent operation request message, deleting a record of an original operation request message corresponding to the re-sent operation request message from the message counter; and/or presetting a threshold time, starting timing while sending an operation request message, and deleting a record of the operation request message from the message counter when no response message of the operation request message is received before the threshold time expires.

5. The method according to claim 2, after the controlling the source resource to store service session context information onto a shared storage device and before the routing a request message according to the adjusted routing table, further comprising:
controlling the target resource to acquire the service session context information from the shared storage device, and creating an online service session according to the service session context information.

6. The method according to claim 5, wherein:
the controlling the source resource to store service session context information onto a shared storage device comprises: controlling the source resource to use an identifier of the service session as a key value and store the service session context information onto the shared storage device; and
the controlling the target resource to acquire the service session context information from the shared storage device comprises: sending a migration instruction comprising the key value to the target resource, so that the target resource reads the service session context information from the shared device according to the key value.

7. The method according to claim 2, wherein the routing a request message according to the adjusted routing table comprises:
sending a new operation request message to the target resource, so that the target resource reads the service session context information from the shared device according to user identity information or a session identifier in the new operation request message and creates an online service session according to the service session context information.

8. A scheduling device comprising:
a non-transitory computer-readable storage medium to store program(s); and
computer hardware configured to implement, including configured by the program(s) to implement:
  a routing table control unit, configured to adjust a routing table according to a preset adjusting rule;
  a migration control unit, configured to migrate, when the adjustment performed by the routing table control unit on the routing table affects an online service session, the online service session from a source resource indicated by the routing table before the adjustment to a target resource indicated by the adjusted routing table, wherein the adjusting the routing table affects the online service session comprises a service resource for the online service session indicated by the adjusted routing table is different from that indicated by the routing table before the adjustment;
  a routing unit, configured to route a request message according to the adjusted routing table;
  a buffering unit, configured to buffer a session message from a service requester;
  a sending control unit, configured to control a sending unit to send the session message that is from the service requester and buffered by the buffering unit to the target resource; and
  the sending unit, configured to send, under the control of the sending control unit, the session message that is from the service requester and buffered by the buffering unit to the target resource.

9. The scheduling device according to claim 8, wherein:
the migration control unit is configured to determine whether the source resource is performing an operation on the online service session; if yes, continue to determine whether the source resource is performing an operation for the online service session; otherwise, control the source resource to store service session context information onto a shared storage device; and
the sending control unit is configured to control the target resource to acquire the service session context information from the shared storage device and control the target resource to create an online service session according to the service session context information.

10. The scheduling device according to claim 9, wherein:
the migration control unit is configured to query a status of the service session on the source resource; if it is an idle status, determine that the source resource is not performing an operation on the online service session; and if it is a busy status, determine that the source resource is performing an operation on the online service session; or
the migration control unit is configured to pre-establish a message list of the service session; add an operation request message to the message list when receiving the operation request message; delete the operation request message from the message list when receiving a response message of the operation request message; query the message list; and if the message list is empty, determine that the source resource is not performing an operation on the online service session, and if the message list is not empty, determine that the source resource is performing an operation on the online service session; or
the migration control unit is configured to pre-establish a message counter of the service session; increase a value of the message counter by 1 when receiving an operation request message; decrease the value of the message counter by 1 when receiving a response message of the operation request message; query the message counter; and if the value of the message counter is zero, determine that the source resource is not performing an operation on the online service session, and if the value of the message counter is not zero, determine that the source resource is performing an operation on the online service session.

* * * * *